(12) United States Patent
Kitamura et al.

(10) Patent No.: US 12,493,054 B2
(45) Date of Patent: Dec. 9, 2025

(54) MEASUREMENT APPARATUS AND MEASUREMENT RESULT DISPLAY METHOD

(71) Applicant: HIOKI E.E. CORPORATION, Nagano (JP)

(72) Inventors: Naoya Kitamura, Nagano (JP); Junji Iijima, Nagano (JP)

(73) Assignee: HIOKI E.E. CORPORATION, Nagano (JP)

( * ) Notice: Subject to any disclaimer, the term of this patent is extended or adjusted under 35 U.S.C. 154(b) by 233 days.

(21) Appl. No.: 18/574,102

(22) PCT Filed: Mar. 25, 2022

(86) PCT No.: PCT/JP2022/014240
§ 371 (c)(1),
(2) Date: Mar. 26, 2024

(87) PCT Pub. No.: WO2023/276344
PCT Pub. Date: Jan. 5, 2023

(65) Prior Publication Data
US 2024/0353448 A1 Oct. 24, 2024

(30) Foreign Application Priority Data
Jul. 1, 2021 (JP) .................. 2021-109939

(51) Int. Cl.
*G01R 13/02* (2006.01)
*G01D 7/10* (2006.01)
(Continued)

(52) U.S. Cl.
CPC ........... *G01R 13/0236* (2013.01); *G01D 7/10* (2013.01); *G01R 27/02* (2013.01); *G01R 31/389* (2019.01); *G01R 13/00* (2013.01)

(58) Field of Classification Search
CPC .. G01R 13/0236; G01R 27/02; G01R 31/389; G01R 13/00; G01R 27/00; G01D 7/10;
(Continued)

(56) References Cited

U.S. PATENT DOCUMENTS

2006/0002239 A1* 1/2006 Gage ................. G01R 31/3191
368/118
2014/0184194 A1* 7/2014 Yamaguchi ........... G01R 29/00
324/76.11
2020/0081039 A1* 3/2020 Kim ...................... G01R 31/50

FOREIGN PATENT DOCUMENTS

JP        2-55779        4/1990
JP        2012-184973        9/2012
(Continued)

OTHER PUBLICATIONS

Dec. 3, 2024 Japanese Office Action in Japanese Application No. 2021-109939 and English translation thereof.
(Continued)

*Primary Examiner* — Raul J Rios Russo
(74) *Attorney, Agent, or Firm* — GREENBLUM & BERNSTEIN, P.L.C.

(57) ABSTRACT

Changes over time in a measured impedance are displayed in an easy to identify manner. A measurement result display apparatus includes a processor that executes a measurement result display process that displays measurement results on a display 5 based on measurement result data produced by encoding impedances that have been measured by a measurement apparatus. During the measurement result display process, the processor displays, on the display 5 and based on a plurality of measurement result data of impedances that satisfy a predetermined comparison condition and were produced by the measurement apparatus at different measurement times, a measurement result display screen 20 with measurement result displays 21*a* to 21*d* (graphs) in which
(Continued)

the impedances for respective measurement result data are aligned in order of measurement time.

16 Claims, 3 Drawing Sheets

(51) Int. Cl.
*G01R 13/00* (2006.01)
*G01R 27/02* (2006.01)
*G01R 31/389* (2019.01)

(58) Field of Classification Search
CPC .... G01L 1/10; G01L 1/20; G01L 1/22; G01N 17/00; G01N 27/02; G01N 27/04
USPC .......................................................... 324/691
See application file for complete search history.

(56) References Cited

FOREIGN PATENT DOCUMENTS

| | | |
|---|---|---|
| JP | 2014-231994 | 12/2014 |
| JP | 2015-31681 | 2/2015 |
| JP | 2015-40775 | 3/2015 |
| JP | 2016-90275 | 5/2016 |
| JP | 2020-76600 | 5/2020 |
| WO | 2020/095471 | 5/2020 |

OTHER PUBLICATIONS

International Search Report issued in International Patent Application No. PCT/JP2022/014240, dated May 31, 2022, along with an English translation thereof.

* cited by examiner

MEASUREMENT APPARATUS AND MEASUREMENT RESULT DISPLAY METHOD

TECHNICAL FIELD

The present invention relates to a measurement result display apparatus capable of displaying measurement results on a display based on measurement result data produced by encoding impedance values measured by a measurement apparatus, a measurement system equipped with this measurement result display apparatus, and a measurement result display processing program that causes a processor of a measurement result display apparatus to execute a measurement result display process.

BACKGROUND ART

In the patent literature cited below, the present applicant disclosed an impedance measurement apparatus capable of individually measuring the respective contact resistances of a Hi-side and a Lo-side source terminal and a Hi-side and a Lo-side sensing terminal for an object to be measured. The impedance measurement apparatus disclosed by the applicant is equipped with a Hi-side source terminal and a Lo-side source terminal (that is, source terminals for supplying a measurement signal: hereinafter also referred to as the "terminals Hc and Lc") and a Hi-side sensing terminal and a Lo-side sensing terminal (that is, sensing terminals for signal detection: hereinafter also referred to as the "terminals Hp and Lp"), a measurement signal source, and a measurement unit.

This impedance measurement apparatus is configured so that in a state where one electrode (as one example, the positive electrode) of a battery as the object to be measured has been connected to the terminals Hc and Hp and the other electrode (as one example, the negative electrode) has been connected to the terminals Lc and Lp, it is possible to measure a connection resistance RHC between the terminal Hc and the positive electrode, a connection resistance RLC between the terminal Lc and the negative electrode, a connection resistance between the terminal Hp and the positive electrode, and a connection resistance between the terminal Lp and the negative electrode, together with the impedance (in this example, an "internal resistance Rx of the battery") of the object to be measured. This impedance measurement apparatus is further equipped with an output unit composed of a display apparatus.

By using this configuration, the impedance measurement apparatus disclosed by the present applicant is capable of outputting (displaying) the internal resistance Rx of a battery, the connection resistances RHC and RHP between the terminals Hc and Hp and the positive electrode, and the connection resistances RLC and RLP between the terminals Lc and Lp and the negative electrode.

CITATION LIST

Patent Literature

PTL1: Japanese Laid-open Patent Publication No. 2020-076600 (see pages 8 to 28 and FIGS. 1 to 4)

SUMMARY OF INVENTION

Technical Problem

However, the impedance measurement apparatus disclosed by the present applicant has the following problem to be solved. In more detail, as described earlier, the impedance measurement apparatus disclosed by the present applicant is configured to be capable of displaying (outputting) values such as the internal resistance Rx of a battery as the object to be measured, the connection resistances RHC and RHP between the terminals Hc and Hp and the positive electrode, and the connection resistances RLC and RLP between the terminals Lc and Lp and the negative electrode using a display apparatus (or "output unit").

On the other hand, when this type of measurement apparatus is installed at a manufacturing facility for batteries or the like and products are determined to be defective or non-defective based on the measurement results, during repeated execution of a measurement process for a plurality of products (that is, batteries) that are manufactured one after the other, the terminals Hc, Lc, Hp, and Lp may gradually wear out and/or dirt may adhere to the terminals Hc, Lc, Hp, and Lp. When this happens, there is the risk of the measurement result (that is, the internal resistance Rx of each product) being inaccurate, which makes it difficult to determine whether products are defective or non-defective based on the measurement results. Accordingly, it is necessary to check whether the contact resistances between the terminals Hc, Lc, Hp, and Lp and the object (electrodes) to be measured are within a range of normal values based on the displayed contact resistances RHC, RLC, RHP, and RLP and keep the measurement apparatus in a state where accurate measurement results (here, the internal resistance Rx) are obtained.

As one example, the impedance measurement apparatus disclosed by the present applicant uses a configuration where every time a measurement process is performed on an object to be measured (or "product", here a battery), the contact resistances RHC, RLC, RHP, and RLP measured by the measurement process are displayed as numeric values together with the internal resistance Rx. By doing so, when any of the displayed contact resistances RHC, RLC, RHP, and RLP deviates from the range of normal values, it is possible to check the extent of wear of and adhesion of foreign matter to the terminal for which the deviant value was measured, and if the extent of wear is high or there is adhering foreign matter, it is possible to replace and/or clean the terminal in question to return the measurement apparatus to a state where the internal resistance Rx can be accurately measured (that is, a state where it is possible to accurately determine whether products are non-defective).

Operations such as checking the extent of terminal wear and checking whether there is adhering foreign matter, and operations such as replacing and/or cleaning a terminal cannot be performed while a production line of the object to be measured (here, batteries) is running. Accordingly, it is preferable for these operations to be performed at predetermined timing when the production line is not running so as to not interfere with the manufacturing plan for the product.

However, even if the latest measurement results indicate that the contact resistance of one of the terminals is a value about to exceed the range of normal values, it is not possible to identify whether such values have been measured ever since a previous replacement operation or the completion of a cleaning operation or whether such value has been measured suddenly and unexpectedly. Accordingly, even if it is possible to recognize the presence of a terminal whose contact resistance is likely to exceed the range of normal values, it is difficult to determine the timing at which such terminal will need to be replaced or cleaned (that is, when a state where a contact resistance that exceeds the range of normal values will be measured). For this reason, what presently happens is that replacement of terminals with new terminals and/or cleaning of terminals is/are performed while the production line is not running, even for terminals where the contact resistance is still within the range of normal values (that is, terminals for which wear and the adhesion of dirt are within tolerated levels). It would therefore be preferable to improve this situation.

In addition, in the impedance measurement apparatus disclosed by the present applicant, to make it possible to identify a terminal whose contact resistance has been measured, a configuration is used where the "terminal name" and the "measurement result" are displayed side by side, such as "Hc: ○○Ω", "Lc: ○○Ω", "Hp: ○○Ω", and "Lp: ○○Ω". However, for an operator unfamiliar with this type of apparatus, it is not easy to identify which of the four terminals is the terminal for which a contact resistance, such as "Hc: ○○Ω", was measured. For this reason, even when a checking operation, replacement operation, or cleaning operation is to be performed in keeping with a displayed contact resistance, it may take a long time to identify which terminal is to be subjected to the operation. It would also be preferable to improve this situation.

The present invention was conceived in view of the above problems to be solved and has a principal object of providing a measurement result display apparatus, a measurement system, and a measurement result display processing program capable of displaying changes over time in measured impedances in an easy to identify manner. It is a further object of the present invention to provide a measurement result display apparatus, a measurement system, and a measurement result display processing program that make it easy to identify via which measurement terminal a displayed impedance was measured.

Solution to Problem

A measurement result display apparatus according to the present invention comprises: a processor that executes a measurement result display process that displays measurement results on a display based on measurement result data produced by encoding impedances that have been measured a by measurement apparatus, wherein during the measurement result display process, the processor displays, on the display and based on a plurality of measurement result data of impedances that satisfy a predetermined comparison condition and were produced by the measurement apparatus at different measurement times, a first measurement result display screen in which the impedances for respective measurement result data are aligned in order of measurement time.

Also, a measurement system according to the present invention comprises: the measurement result display apparatus and the measurement apparatus, wherein the measurement system is configured to generate the measurement result data using the measurement apparatus and to display the measurement results using the measurement result display apparatus. Also, a measurement result display processing program according to the present invention that causes a processor of a measurement result display apparatus, which includes the processor that executes a measurement result display process that has a display display measurement results based on measurement result data produced by encoding impedances that have been measured by a measurement apparatus, to execute the measurement result display process, the program causing the processor to execute, during the measurement result display process, a process that displays, on the display and based on a plurality of measurement result data of impedances that satisfy a predetermined comparison condition and were produced by the measurement apparatus at different measurement times, a first measurement result display screen in which impedances for respective measurement result data are aligned in order of measurement time.

With the measurement result display apparatus, the measurement system, and the measurement result display processing program, by referring to impedances displayed on a first measurement result display screen, it is possible to determine whether impedances is changing over time and possible to easily and reliably determine the rate of change of impedances. By doing so, it is possible to reliably and easily estimate what kind of impedances will be measured for the object to be measured at what timing. Accordingly, as one example, by using the measurement result display apparatus, the measurement system, and the measurement result display processing program when operations such as checking the state, replacement, or cleaning of a measurement terminal are performed based on the contact resistance between the measurement terminal and the object to be measured, it is possible to favorably determine appropriate timing for performing such operations.

Also, with the measurement result display apparatus according to the present invention, wherein in the measurement result display process, the processor displays a graph indicating the impedances for each measurement result data in the first measurement result display screen. Also, with the measurement result display processing program according to the present invention, wherein in the measurement result display process, the processor is caused to execute a process that displays a graph indicating the impedances for each measurement result data in the first measurement result display screen.

With the measurement result display apparatus, the measurement system, and the measurement result display processing program, compared to when numerical values of the contact resistance are displayed on the first measurement result display screen for example, it is possible to more reliably and more easily identify whether the contact resistance has changed over time and the rate of change in the contact resistance based on graphs of impedances. By doing so, it is possible to more reliably and more easily estimate what kind of impedances will be measured for the object to be measured at what timing.

Also, with the measurement result display apparatus according to the present invention, wherein in the measurement result display process, the processor displays, on the display and based on a plurality of types of measurement result data measured by the measurement apparatus via a plurality of measurement terminals connected to a plurality of measurement terminal connectors of the measurement apparatus, a second measurement result display screen in which impedances for each measurement result data are aligned corresponding to an arrangement on the measurement apparatus of the measurement terminal connectors. Also, with the measurement result display processing program according to the present invention, wherein in the measurement result display process, the processor is caused to execute a process of displaying, on the display and based on a plurality of types of measurement result data measured by the measurement apparatus via a plurality of measurement terminals connected to the plurality of measurement terminal connectors of the measurement apparatus, a second measurement result display screen in which impedances for each measurement result data are aligned corresponding to an arrangement on the measurement apparatus of the measurement terminal connectors.

With the measurement result display apparatus, the measurement system, and the measurement result display processing program, it is possible to reliably and easily identify via which of the measurement terminals (that is, which of the measurement terminals connected to the measurement terminal connectors) impedances displayed on the second measurement result display screen were measured. Accordingly, as one example, by using the measurement result display apparatus, the measurement system, and the measurement result display processing program when performing a checking operation on the state of the measurement terminal or performing a replacement or cleaning operation on the measurement terminal based on the contact resistance between the measurement terminal and an the object to be measured, it is possible to reliably and easily identify the measurement terminal whose impedances was measured and is to be subjected to the operation, so that the operation can be performed quickly and reliably.

Also, with the measurement result display apparatus according to the present invention, wherein during the measurement result display process, when an impedance displayed based on the measurement result data satisfies a predetermined notification condition, the processor executes a notification process giving notification which makes it possible to identify which of the displayed impedances has satisfied the predetermined notification condition. Also, with the measurement result display processing program according to the present invention, wherein during the measurement result display process, when an impedance displayed based on the measurement result data satisfies a predetermined notification condition, the processor is caused to execute a notification process giving notification which makes it possible to identify which of the displayed impedances has satisfied the predetermined notification condition.

With the measurement result display apparatus, the measurement system, and the measurement result display processing program, it is possible to reliably and easily identify that a impedances has satisfied the predetermined notification condition without constantly monitoring impedances displayed on the first measurement result display screen and/or impedances displayed on the second measurement result display screen.

Advantageous Effects of Invention

With the measurement result display apparatus, measurement system, and measurement result display processing program according to the present invention, it is possible to display changes over time in measured impedances in an easy to identify manner. Also, according to the measurement result display apparatus, measurement system, and measurement result display processing program according to the present invention, it is possible to easily identify via which measurement terminal a displayed impedance was measured.

BRIEF DESCRIPTION OF DRAWINGS

FIG. 6 is a display screen diagram depicting one example of a measurement result display screen 20a.

DESCRIPTION OF EMBODIMENTS

Preferred embodiments of a measurement result display apparatus, a measurement system, and a measurement result display processing program according to the present invention will now be described with reference to the attached drawings.

Figure 1:
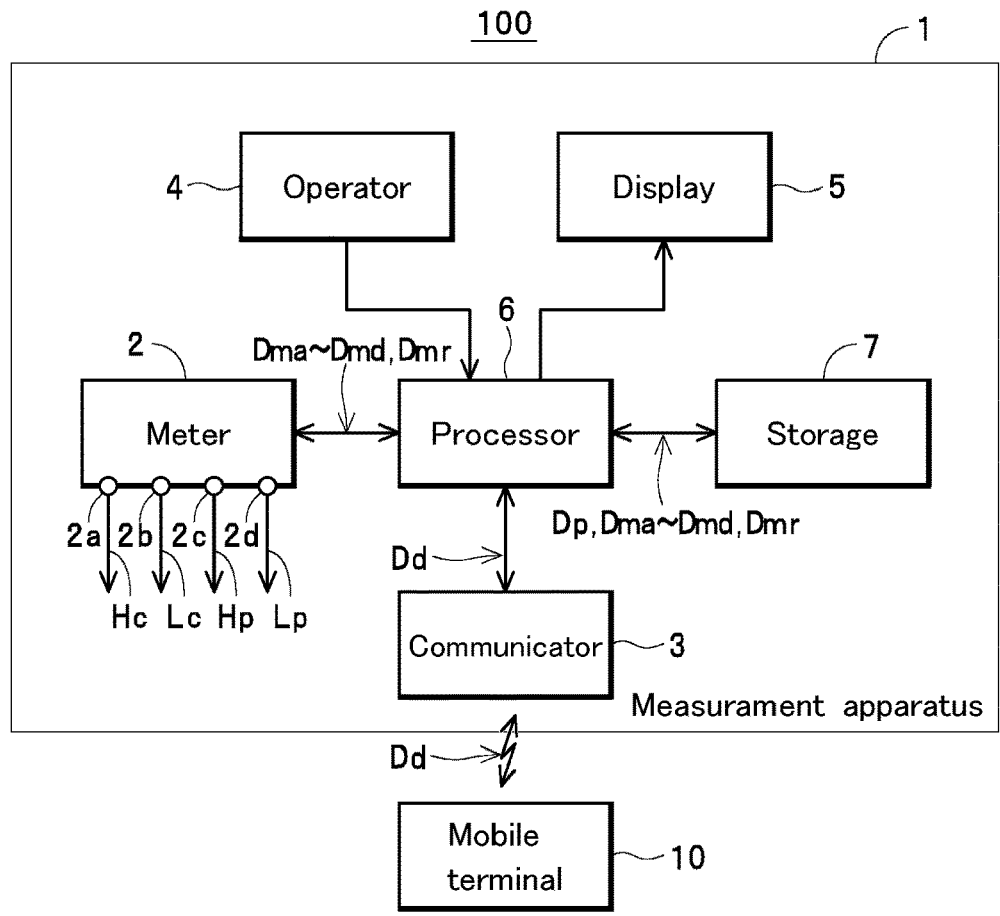
FIG. 1 is a block diagram depicting the configuration of a measurement apparatus 1.

A measurement system 100 depicted in FIG. 1 is one example of a "measurement system" for the present invention, includes a measurement apparatus 1 and a mobile terminal 10, and is configured, in the same way as the impedance measurement apparatus disclosed by the present applicant in the cited patent literature, so as to be capable of measuring the internal resistance of an object to be measured (as one example, a battery, not illustrated) and the contact resistances (one example of "impedances" for the present invention) between measurement terminals and the object to be measured (in the present embodiment, the electrodes of a battery) and displaying as measurement results.

The measurement apparatus 1 integrally includes a "measurement apparatus" and a "measurement result display apparatus", and as described above, constructs, in combination with the mobile terminal 10, the measurement system 100 according to the present embodiment, which is one example of a "measurement system" for the present invention. The measurement apparatus 1 also constructs a "measurement system" by itself. This measurement apparatus 1 includes a meter 2, a communicator 3, an operator 4, a display 5, a processor 6, and a storage 7. In this case, in the measurement apparatus 1 according to the present embodiment, the meter 2, the operator 4, the display 5, the processor 6, and the storage 7 together construct a "measurement apparatus" for the present invention, and the operator 4, the display 5, the processor 6, and the storage 7 together construct a "measurement result display apparatus that is integrally provided with a display (the display 5)".

Figure 4:
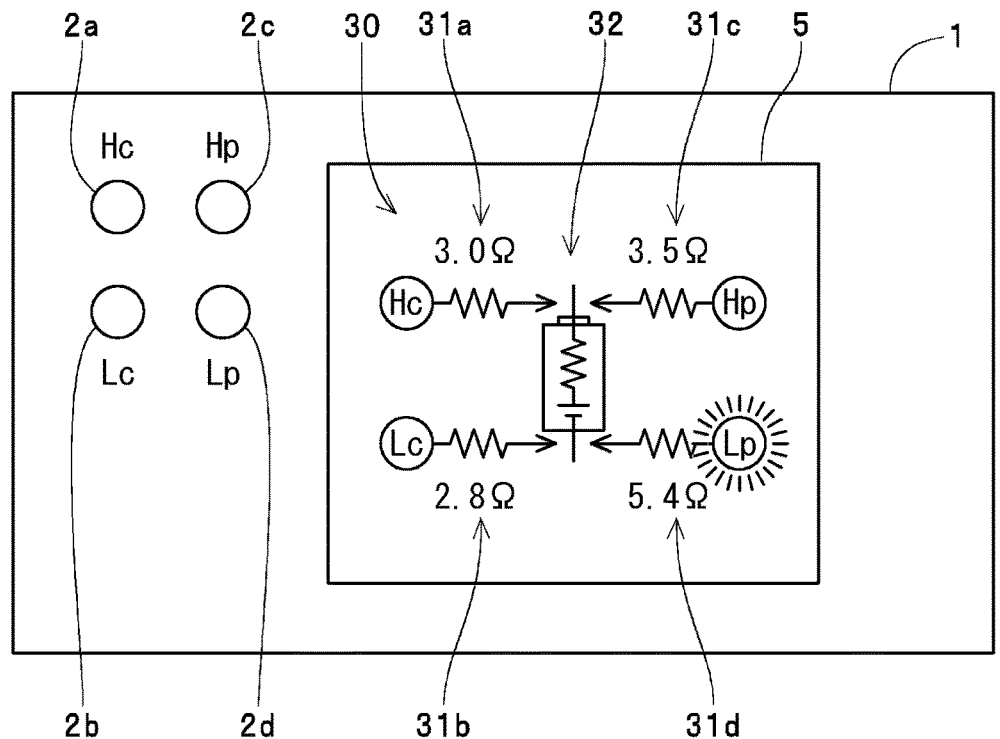
FIG. 4 is a front view of a measurement apparatus 1 in a state where a measurement result display screen 30 is displayed on a display 5.

In the same way as the impedance measurement apparatus disclosed by the applicant, the meter 2 has a Hi-side source terminal and a Lo-side source terminal (source terminals for supplying measurement signals or the "terminals Hc and Lc", one example of "a plurality of measurement terminals" for the present invention), a Hi-side sensing terminal and a Lo-side sensing terminal (sensing terminals for detecting signals, or the "terminals Hp and Lp", another example of "a plurality of measurement terminals" for the present invention), and a measurement signal source (none of which are illustrated). As will be described later, the meter 2 is configured to be capable of executing a measurement process, which measures the internal resistance of a battery, under the control of the processor 6. Here, in the measurement apparatus 1 according to the present embodiment, as depicted in FIG. 4, measurement terminal connectors 2a to 2d (one example of "a plurality of measurement terminal connectors of the measurement apparatus" for the present invention) are arranged on the front panel. The measurement apparatus 1 is configured so that by connecting the terminals Hc, Lc, Hp, and Lp described above to the measurement terminal connectors 2a to 2d, respectively, it is possible to execute a measurement process that measures a predetermined electrical parameter via the terminals Hc, Lc, Hp, and Lp.

In more detail, in the measurement apparatus 1 according to the present embodiment, the meter 2 is configured to be capable of executing, as the "measurement process", a process that measures, together with the internal resistance of the battery, the contact resistance between the terminal Hc and the positive electrode of the battery, the contact resistance between the terminal Lc and the negative electrode of the battery, the contact resistance between the terminal Hp and the positive electrode, and the contact resistance between the terminal Lp and the negative electrode, generates measurement result data Dma produced by encoding the contact resistance between the terminal Hc and the positive electrode, measurement result data Dmb produced by encoding the contact resistance between the terminal Lc and the negative electrode, measurement result data Dmc produced by encoding the contact resistance between the terminal Hp and the positive electrode, measurement result data Dmd produced by encoding the contact resistance between the terminal Lp and the negative electrode, and measurement result data Dmr produced by encoding the internal resistance of the battery, and outputs to the processor 6. Note that in the present embodiment, the measurement result data Dma to Dmd described above correspond to "measurement result data produced by encoding impedances that have been measured by a measurement apparatus".

As one example, the communicator 3 is constructed of a wireless communication module that conforms to Bluetooth (registered trademark) standard, and as described later, is configured to be capable of transmitting and receiving various types of data to and from various devices that are compatible with Bluetooth communication, such as the mobile terminal 10, under control by the processor 6. The operator 4 is provided with operation switches that make it possible to execute operations such as a setting operation for operating conditions of the measurement apparatus 1, an operation that issues start and stop instructions for the measurement process by the meter 2, and a switching operation for various display screens, described later, displayed on the display 5. The display 5 is one example of a "display", and displays various display screens such as an operating condition setting screen (not illustrated) for setting operating conditions of the measurement apparatus 1, a measurement result display screen 20 (see FIGS. 2 and 3), and a measurement result display screen 30 (see FIG. 4), under the control of the processor 6.

The processor 6 is one example of a "processor" for the present invention and performs overall control of the measurement apparatus 1 according to a processing program Dp (one example of a "measurement result display processing program" for the present invention). In more detail, the processor 6 controls the meter 2 to execute the measurement process described above and has the measurement result data Dma to Dmd and Dmr outputted from the meter 2 stored in the storage 7. The processor 6 also has the display 5 display a resistance value (the internal resistance of the battery to be measured) that was encoded in the measurement result data Dmr. In addition, the processor 6 has the display 5 display one of the measurement result display screens 20 and 30 and thereby has the display 5 display the resistance values (that is, the contact resistances between the terminals and the electrodes) encoded in the measurement result data Dma to Dmd (one example of a "measurement result display process"). Here, as one example, the measurement apparatus 1 according to the present embodiment is configured so that through the operation of the meter 2, one of the measurement result display screen (not illustrated) displaying the internal resistance and the measurement result display screens 20 and 30 is selected and the selected display screen is displayed on the display 5.

The processor 6 in the measurement apparatus 1 according to the present embodiment is also configured to generate display data Dd in parallel with the displaying of the measurement result display screens 20 and 30 or the like on the display 5 and to transmit the generated display data Dd from the communicator 3 to the mobile terminal 10 so that a display of the mobile terminal 10 can display a display screen (not illustrated) that is similar to the measurement result display screen 20, 30, or the like. In this case, the measurement apparatus 1 according to the present embodiment is configured so that in addition to displaying a similar display screen to the measurement result display screen displayed on the display 5 of the measurement apparatus 1 on the display of the mobile terminal 10, by setting the operating conditions of the measurement apparatus 1 in advance, it is possible to display a similar display screen to the measurement result display screen 30 on the display of the mobile terminal 10 in a state where the measurement result display screen 20 is displayed on the display 5 of the measurement apparatus 1 or to display a similar display screen to the measurement result display screen 20 on the display of the mobile terminal 10 in a state where the measurement result display screen 30 is displayed on the display 5 of the measurement apparatus 1.

The storage 7 stores a processing program Dp capable of specifying the procedures of various processes executed by the processor 6, computation results of the processor 6, the measurement result data Dma to Dmd and Dmr described above, and the like.

On the other hand, the mobile terminal 10 is a mobile information processing terminal capable of transmitting and receiving various data to and from devices, such as the measurement apparatus 1, that are compatible with Bluetooth communication. As one example, the mobile terminal 10 is composed of a general-purpose tablet or smartphone in which a dedicated data processing program for executing the displaying of a display screen based on the display data Dd transmitted from the measurement apparatus 1 has been installed. In this case, in a configuration where a similar display screen to the measurement result display screen 20 or 30 is displayed on the display of the mobile terminal 10 in parallel with the displaying of the measurement result display screen 20 or 30 on the display 5 of the measurement apparatus 1 as in the present embodiment, a screen displaying program installed in the mobile terminal 10 together with the processing program Dp described above constructs a "measurement result display processing program" for the present invention, and a processor of the mobile terminal 10 that displays a similar display screen to the measurement result display screens 20 and 30 on the display of the measurement apparatus 1 in keeping with this program constructs, together with the processor 6 of the measurement apparatus 1, a "processor" for the present invention.

Next, as a method of using the measurement system 100, as one example, a method where the measurement system 100 is installed as part of the manufacturing equipment on a production line for batteries, the internal resistances of the batteries that are manufactured one after another are measured by the measurement apparatus 1, and the measurement results are monitored (that is, the batteries are determined to be defective or non-defective) will be described.

Note that since a moving mechanism for moving the terminals Hc, Lc, Hp, and Lp so as to relatively approach and move away from the electrodes of a battery (that is, the positive electrode and the negative electrode), a conveying mechanism for conveying a battery to a measurement processing position, and the like are the same as corresponding apparatuses used in various known manufacturing equipment, detailed description and illustration of such mechanisms have been omitted. In addition, tasks such as installation of the measurement apparatus 1 on a production line, installation of the program described above in the mobile terminal 10, pairing for wireless communication between (the communicator 3 of) the measurement apparatus 1 and the mobile terminal 10, and the like are assumed to have been completed and description thereof is omitted.

On the production line where the measurement apparatus 1 (the measurement system 100) has been installed, every time a new battery is manufactured, the internal resistance of the battery is measured by the measurement apparatus 1 and is displayed on the display 5. In more detail, the terminals Hc, Lc, Hp, and Lp of the measurement apparatus 1 are brought into contact with both electrodes of the manufactured battery, the contact resistances and the internal resistance are measured by the meter 2 via these terminals, and the measurement result data Dma to Dmd and Dmr is generated by encoding the measured internal resistance.

As one example, the measurement apparatus 1 is configured so that a measurement result display screen (not illustrated) displaying the "internal resistance of the battery" which is measured in turn for each battery is displayed as an initial display screen. Accordingly, in keeping with the processing process Dp, the processor 6 has the measurement result display screen on the display 5 display the internal resistance that has been encoded in the measurement result data Dmr outputted from the meter 2. By referring to this internal resistance, it is possible to determine whether a manufactured battery is defective or non-defective. Note that although detailed description and illustration have been omitted, the measurement apparatus 1 according to the present embodiment uses a configuration where when the internal resistance measured as described above exceeds a normal determination value that has been set in advance, the internal resistance is displayed so as to flash on the display 5 and a warning sound is emitted from a speaker (not illustrated). Accordingly, it is possible to reliably and easily identify defective batteries for which a high internal resistance that exceeds the normal determination value has been measured.

Figure 2:
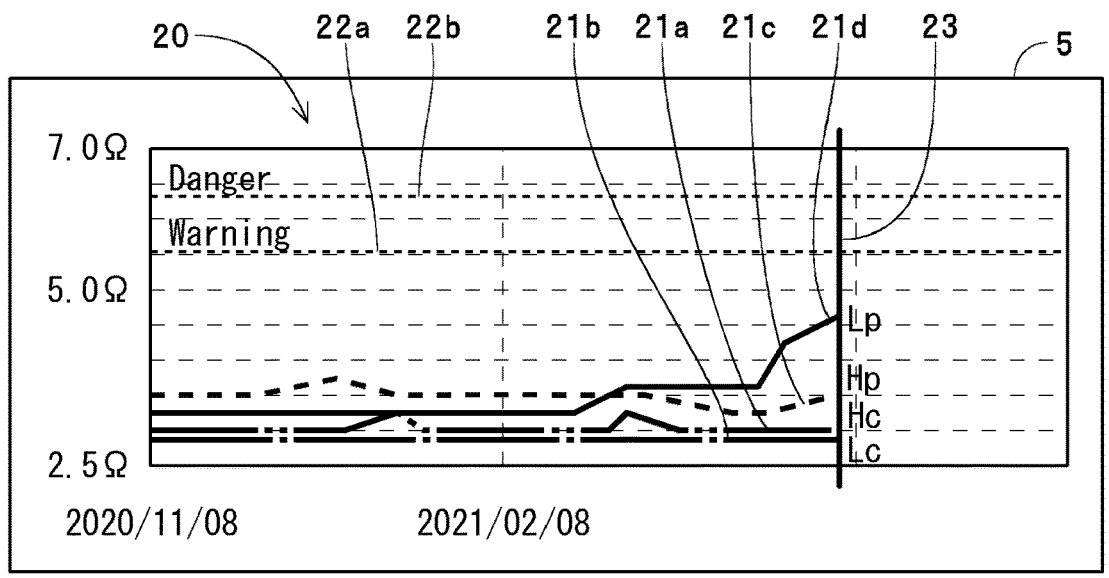
FIG. 2 is a display screen diagram depicting one example of a measurement result display screen 20.

In addition, in this measurement apparatus 1 (or measurement system 100), it is also possible to operate the operator 4 to display the measurement result display screen 20 depicted in FIG. 2 on the display 5 in place of the measurement result display screen described above that displays the internal resistance of the object to be measured (here, a battery). This measurement result display screen 20 is one example of a "first measurement result display screen" for the present invention, and is a screen configuration that displays a "contact resistance between each terminal and each electrode" in order of measurement time for each of a plurality of measurement result data Dma to Dmd (one example of "a plurality of measurement result data of impedances that satisfy a predetermined comparison condition and were produced by the measurement apparatus at different measurement times") generated by measurement processes on respective batteries that are manufactured one after another on a production line on which the measurement apparatus 1 has been installed.

In more detail, on the measurement result display screen 20, a measurement result display 21a of a graph (in the present embodiment, a line graph) that makes it possible to determine the contact resistance between the terminal Hc and the positive electrode at each measurement time (that is, for each battery to be measured), a measurement result display 21b of a graph (a line graph) that makes it possible to determine the contact resistance between the terminal Lc and the negative electrode at each measurement time, a measurement result display 21c of a graph (a line graph) that makes it possible to determine the contact resistance between the terminal Hp and the positive electrode at each measurement time, and a measurement result display 21d of a graph (a line graph) that makes it possible to determine the contact resistance between the terminal Lp and the negative electrode for each measurement time (for each battery to be measured) are displayed (hereinafter when no distinction is made between the measurement result displays 21a to 21d, these displays are collectively referred to as the "measurement result display 21"). Here, as one example, on the right side of the measurement result display 21a, the characters "Hc" are displayed to make it possible to identify that values for the terminal Hc are indicated, on the right side of the measurement result display 21b, the characters "Lc" are displayed to identify that values for the terminal Lc are indicated, on the right side of the measurement result display 21c, the characters "Hp" are displayed to make it possible to identify that values for the terminal Hp are indicated, and on the right side of the measurement result display 21d, the characters "Lp" are displayed to make it possible to identify that values for the terminal Lp are indicated.

Also, a warning level display 22a that indicates a preset first warning value (a value that is within a range of normal values but gives a warning that a slightly high contact resistance has been measured) and a warning level display 22b indicating a preset second warning value (a value that is still within the range of normal values but is higher than the first warning value and gives warning that a contact resistance indicating that it is necessary to immediately check the terminal where such value was measured) are also displayed in the measurement result display screen 20. A cursor display 23 for selecting measurement values at a freely chosen time out of the contact resistances at each measurement time displayed in the measurement result displays 21a to 21d (graphs) is also displayed in the measurement result display screen 20. Note that as one example, this cursor display 23 is automatically moved to the position where the latest measured values (contact resistances) are selected (that is, the ends of the measurement result displays 21a to 21d), with it being possible to move the cursor to a position that selects any freely chosen measurement time (that is, any of the objects being measured) through an operation of the operator 4.

In this case, in the example depicted in FIG. 2, measurement result displays 21a to 21d for the plurality of measurement result data Dma to Dmd generated during the measurement processes performed on each battery manufactured one after the other from the start of the production line on Nov. 8, 2020 are displayed on the measurement result display screen 20. In addition, in the example depicted in FIG. 2, by referring to the measurement result displays 21a to 21c, it is possible to identify that the contact resistances of the terminals Hc, Lc, and Hp have not significantly changed, and by referring to the measurement result display 21d, it is possible to identify that the contact resistance of the terminal Lp is gradually increasing. On the other hand, in the example depicted in FIG. 2, it can be intuitively understood that the contact resistances of all of the terminals Hc, Lc, Hp, and Lp are still lower than the first warning value described above. Accordingly, it is possible to reliably and easily identify that none of the terminals is in a state where a checking operation, a replacement operation, or a cleaning operation is immediately necessary.

Figure 3:
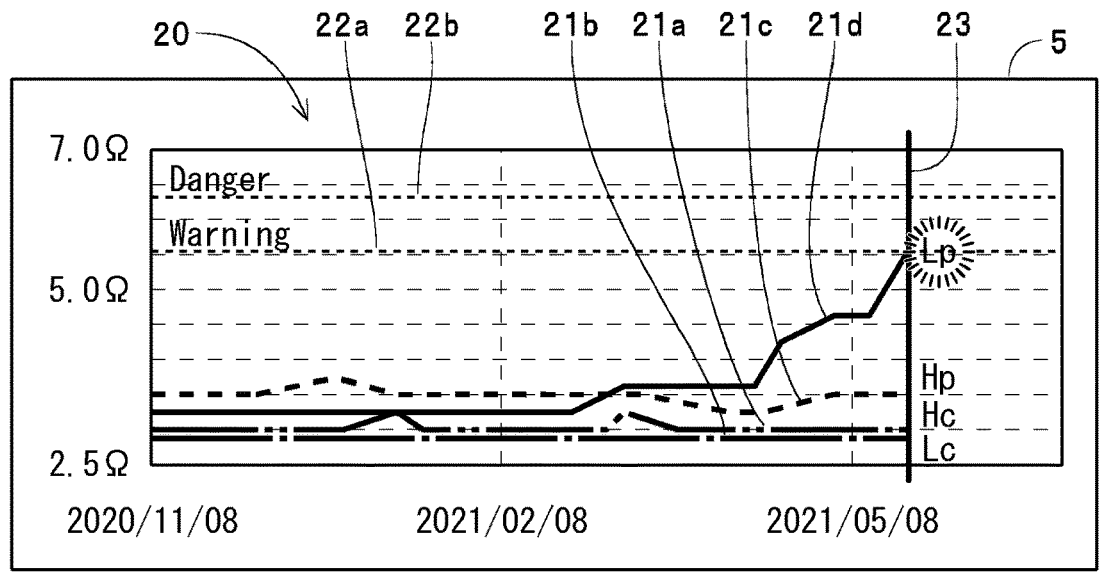
FIG. 3 is a display screen diagram depicting another example of a measurement result display screen 20.

On the other hand, during repetition of the measurement process on each battery, the contact resistance between the terminal Lp and the negative electrode, which had been gradually increasing, may reach the first warning value (this is one example of "when the impedance displayed based on the measurement result data satisfies a predetermined notification condition"). In this case, as depicted in FIG. 3, a measurement result display 21d indicating that the contact resistance has reached the warning level display 22a is displayed on the measurement result display screen 20, the characters "Lp" are displayed so as to flash, and a warning sound is emitted from a speaker (not illustrated) (one example of "a notification process giving notification which makes it possible to identify which of the displayed impedances has satisfied the predetermined notification condition"). Note that in place of (or in addition to) this notification process, it is possible to execute processing that causes any measurement result display 21 that has reached the warning level display 22a to flash, or to change the display color and line type to a different display color and line type from a state where the notification process is not being executed (the "normal state").

An operator who has seen this display on the measurement result display screen 20 or heard the warning sound can grasp, based on the measurement result display 21d that has reached the warning level display 22a and the flashing display of the letters "Lp", that the contact resistance measured via the terminal Lp has reached the first warning value. At this time, since the first warning value is within the range of normal values, when the rate of change in the contact resistance determined based on the measurement result display 21d is the same as the preceding rate of change (that is, when the latest measurement value is located on an extension of the slope of a graph of the previously measured measurement values), it is determined whether the contact resistance will exceed the range of normal values if the production line is left as it is without performing a checking, replacement, or cleaning operation before the production line is scheduled to be taken out of service. When there is no risk of the contact resistance exceeding the range of normal values, a decision is taken to not perform any of such operations.

On the other hand, in the present embodiment described above, when it has been determined that there is a risk of the contact resistance exceeding the range of normal values if an operation is not performed before the production line is taken out of service, when it is not problematic to stop the production line, or when, unlike the example depicted in FIG. 3, the rate of change in the contact resistance determined based on the measurement result display 21d differs to the previous rate of change and has suddenly increased (when the latest measurement value is positioned higher than an extension of the slope of a graph of the measurement values previously measured, as one example, when the latest measurement value has suddenly changed to a value that exceeds the second warning value), a checking, replacement or cleaning operation is performed on the terminal for which the large contact resistance was measured.

Here, by operating the operator 4 in a state where the cursor display 23 is displayed at the position of the latest measurement value for which the "notification process" described above was executed (that is, at the end of the measurement result displays 21a to 21d), the display is switched from the measurement result display screen 20 to the measurement result display screen 30. The measurement result display screen 30 is one example of a "second measurement result display screen" for the present invention, and is a screen configuration where a measurement result display 31a based on measurement result data Dma for the terminal Hc, a measurement result display 31b based on measurement result data Dmb for the terminal Lc, a measurement result display 31c based on measurement result data Dmc for the terminal Hp, and a measurement result display 31d based on measurement result data Dmd for the terminal Lp are displayed in alignment corresponding to the arrangement on the front panel of the measurement apparatus 1 of the measurement terminal connectors 2a to 2d to which the respective terminals Hc, Lc, Hp, and Lp are connected (hereinafter, when no distinct is made between the measurement result displays 31a to 31d, such displays are collectively referred to as the "measurement result displays 31").

Figure 5:
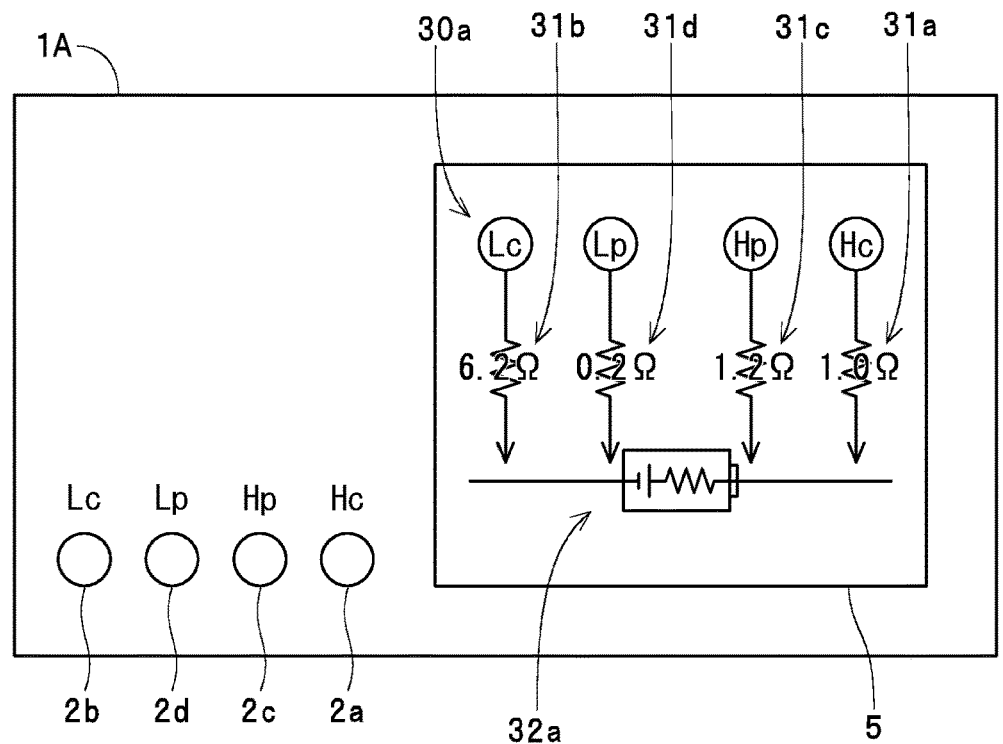
FIG. 5 is a front view of a measurement apparatus 1A in a state where a measurement result display screen 30a is displayed on the display 5.

Here, unlike the measurement apparatus 1 where the measurement terminal connectors 2a to 2d are in the layout depicted in FIG. 4, when the measurement terminal connectors 2a to 2d are arranged in a horizontal layout like a measurement apparatus 1A depicted in FIG. 5, a screen configuration, like the measurement result display screen 30a (another example of a "second measurement result display screen" for the present invention) depicted in FIG. 5, where the measurement result displays 31b, 31d, 31c, and 31a are displayed side by side in a horizontal layout corresponding to the layout on the front panel of the measurement terminal connectors 2b, 2d, 2c, 2a to which the terminals Lc, Lp, Hp, Hc are connected, is used.

In addition, as depicted in FIG. 4, the measurement result display screen 30 displays, together with the measurement result displays 31a to 31d, a layout diagram 32 that enables the contact states between the terminals Hc, Lc, Hp, and Lp and the battery being measured to be visually understood. In more detail, as one example, the layout diagram 32 is composed of a symbol depicting a battery, symbols (in the illustrated example, arrows) indicating the respective terminals Hc, Lc, Hp, and Lp, symbols depicting the respective contact resistances, the characters "Hc" indicating that the measurement result display 31a is the contact resistance for the terminals Hc, the characters "Lc" indicating that the measurement result display 31b is the contact resistance for the terminals Lc, the characters "Hp" indicating that the measurement result display 31c is the contact resistance for the terminals Hp, and the characters "Lp" indicating that the measurement result display 31d is the contact resistance for the terminals Lp.

Note that with the measurement apparatus 1A that displays the measurement result display screen 30a illustrated in FIG. 5, the layout diagram 32a depicted in FIG. 5 is displayed inside the measurement result display screen 30a in place of the layout diagram 32 of the measurement result display screen 30 displayed by the measurement apparatus 1.

On the other hand, in the present embodiment where the display is switched from the measurement result display screen 20 to the measurement result display screen 30 in a state where the contact resistance of the terminal Lp has reached the first warning value, the characters "Lp" described above are displayed so as to flash and a warning sound is emitted from a speaker (not illustrated) (another example of the "a notification process giving notification which makes it possible to identify which of the displayed impedances has satisfied the predetermined notification condition"). Note that in place of (or in addition to) this notification process, it is possible to execute a process that displays the measurement result display 31 that has reached the warning level display 22a so as to flash and/or to display a switched display where the display color and/or character type differs to the normal state.

An operator who has seen this measurement result display screen 30 can grasp, based on the flashing display of the characters "Lp" described above on the measurement result display screen 30 and/or the values of the measurement result display 31d, that the contact resistance of the terminal (in the present embodiment, the terminal Lp) connected to the measurement terminal connector 2d, out of the measurement terminal connectors 2a to 2d, disposed at a position corresponding to the measurement result display 31d has increased. Accordingly, it is possible to quickly start a checking, replacement, or cleaning operation on the terminal Lp connected to the measurement result display 21d and thereby restore the contact resistance of the terminal Lp to a sufficiently low value.

Although a procedure for referring to the measurement result display screens 20 and 30 displayed on the display 5 to grasp the contact resistance of each terminal Hc, Lc, Hp, and Lp has been described, as mentioned earlier, with the measurement system 100 according to the present embodiment, by transmitting the display data Dd from the measurement apparatus 1 to the mobile terminal 10, it is possible to display a similar display screen to the measurement result display screens 20 and 30 on the display of the mobile terminal 10. Accordingly, with the measurement system 100 according to the present embodiment, it is possible to grasp the contact resistances of the terminals Hc, Lc, Hp, and Lp by referring to the display of the mobile terminal 10 (that is, a display screen that is similar to the measurement result display screens 20 and 30) in place of the display 5 (the measurement result display screens 20 and 30) of the measurement apparatus 1.

In this way, in the measurement apparatus 1, during the "measurement result display process" in which the measurement results are displayed on the display 5 based on the measurement result data Dma to Dmd produced by encoding the impedances measured by the meter 2 (in the present embodiment, the contact resistance between each terminal and the electrodes of a battery as the object to be measured), the processor 6 displays, based on a plurality of measurement result data Dma to Dmd that satisfy a predetermined comparison condition and were measured by the meter 2 impedance at different measurement times, the measurement result display screen 20 including the measurement result displays 21a to 21d where contact resistances for each of the measurement result data Dma to Dmd have been aligned in order of measurement time. This measurement system 100 (or measurement apparatus 1) includes a "measurement result display apparatus" and a "measurement apparatus 1". In addition, with the processing program Dp, the processor 6 of the measurement apparatus 1 is caused to execute the "measurement result display process" described above.

Accordingly, with the measurement apparatus 1, the measurement system 100, and the processing program Dp, by referring to the measurement result displays 21a to 21d displayed on the measurement result display screen 20, it is possible to determine whether each contact resistance is changing over time and possible to easily and reliably determine the rate of change of each contact resistance. By doing so, it is possible to reliably and easily estimate what kind of contact resistance will be measured for the object to be measured at what timing. Accordingly, as one example, by using the measurement apparatus 1, the measurement system 100, and the processing program Dp when operations such as checking the state, replacement, or cleaning of a terminal are performed based on the contact resistance between the terminal and an electrode, it is possible to favorably determine appropriate timing for performing such operations.

With the measurement apparatus 1, in the "measurement result display process", the processor 6 displays graphs (the measurement result displays 21a to 21d) indicating the contact resistance for each measurement result data Dma to Dmd on the measurement result display screen 20. The processing program Dp also causes the processor 6 of the measurement apparatus 1 to execute the "measurement result display process" described above.

Accordingly, with the measurement apparatus 1, the measurement system 100, and the processing program Dp, compared to when numerical values of the contact resistance are displayed on the "first measurement result display screen" for example, it is possible to more reliably and more easily identify whether the contact resistance has changed over time and the rate of change in the contact resistance based on graphs of contact resistance (the measurement result displays 21a to 21d). By doing so, it is possible to more reliably and more easily estimate what kind of contact resistance will be measured for the object to be measured at what timing.

Also with the measurement apparatus 1, in the "measurement result display process", the processor 6 displays, on the display 5 and based on the measurement result data Dma to Dmd measured by the meter 2 via the plurality of terminals Hc, Lc, Hp, and Lp that are connected to the plurality of measurement terminal connectors 2a to 2d of the meter 2, the measurement result display screen 30 including the measurement result displays 31a to 31d in which the contact resistances are aligned for each measurement result data Dma to Dmd corresponding to the arrangement of the measurement terminal connectors 2a to 2d on the measurement apparatus 1. The processing program Dp also causes the processor 6 of the measurement apparatus 1 to execute the "measurement result display process" described above.

Accordingly, with the measurement apparatus 1, the measurement system 100, and the processing program Dp, it is possible to reliably and easily identify via which of the terminals Hc, Lc, Hp, and Lp (that is, which of the terminals Hc, Lc, Hp, and Lp connected to the measurement terminal connectors 2a to 2d) the measurement result displays 31a to 31d displayed on the measurement result display screen 30 were measured. Accordingly, as one example, by using the measurement apparatus 1, the measurement system 100, and the processing program Dp when performing a checking operation on the state of a terminal or performing a replacement or cleaning operation on a terminal based on the contact resistance between the terminal and an electrode, it is possible to reliably and easily identify the terminal whose contact resistance was measured and is to be subjected to the operation, so that the operation can be performed quickly and reliably.

According to the measurement apparatus 1, when displaying, during the "measurement result display process", a contact resistance based on the measurement result data Dma to Dmd that satisfies a "predetermined notification condition", the processor 6 also executes a "notification process" (in this example, a flashing display of characters indicating the terminal name of the terminal and/or characters indicating the measured contact resistance) that gives notification that the displayed contact resistance satisfies the "predetermined notification condition". The processing program Dp also causes the processor 6 of the measurement apparatus 1 to execute the "measurement result display process" described above.

Accordingly, with the measurement apparatus 1, the measurement system 100, and the processing program Dp, it is possible to reliably and easily identify that a contact resistance has satisfied the "predetermined notification condition" without constantly monitoring the measurement result displays 21a to 21d displayed on the measurement result display screen 20 and/or the measurement result displays 31a to 31d displayed on the measurement result display screen 30.

Note that the configurations of the "measurement result display apparatus" and the "measurement system" and the processing content of the "measurement result display processing program" are not limited to the examples described above. As one example, although the configuration and processing content for displaying line graphs of contact resistances (the measurement result displays 21a to 21d) on the measurement result display screen 20 corresponding to the "first measurement result display screen" for the present invention have been described as one example, in place of this configuration and processing content, it is also possible to use a configuration and processing content that display contact resistances as bar graphs in the "first measurement result display screen", or a configuration and processing content that display the contact resistances as numerical values in the "first measurement result display screen" (not illustrated).

Figure 6:
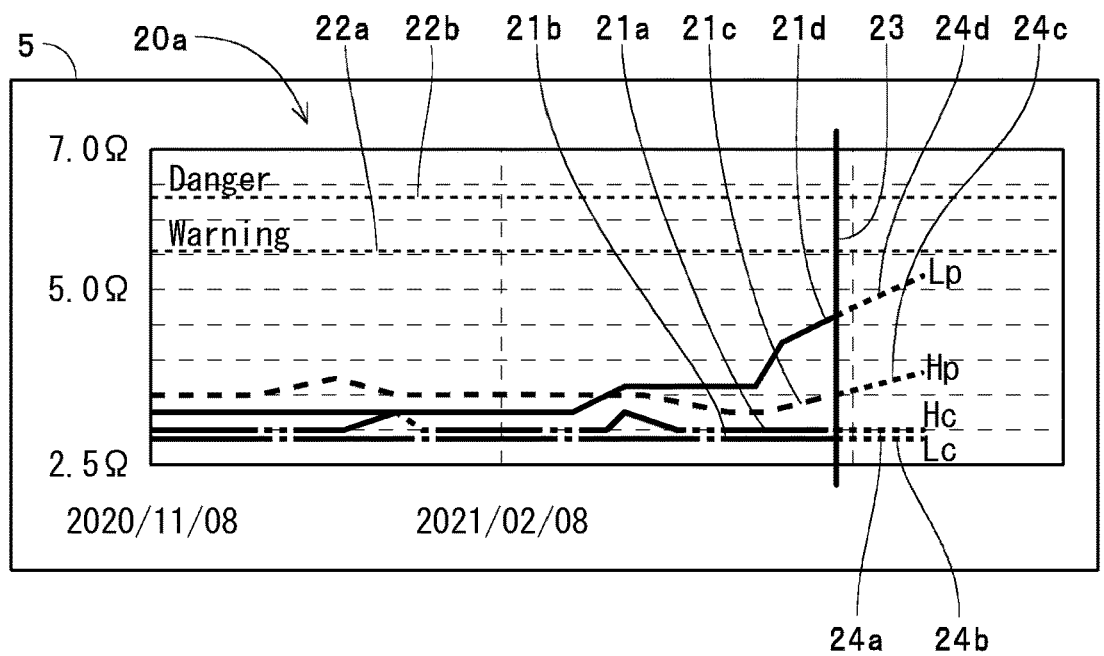

It is also possible to use a configuration and processing content that display predicted value displays 24a to 24d indicating (predicted values of) contact resistances that are predicted to be measured in future executions of the measurement process following the measurement result displays 21a to 21d based on the state of change in a predetermined number of latest contact resistances including the most recent measurement values, in the manner of a measurement result display screen 20a (another example of a "first measurement result display screen" for the present invention) depicted in FIG. 6. In this case, the predicted values indicated by the predicted value displays 24a to 24d can be calculated as one example based on the latest measurement result data Dma to Dmd and the rate of change in the values of each measurement result data Dma to Dmd, which is based on a predetermined number of measurement result data Dma to Dmd that were generated (measured) immediately before the latest data.

In addition, although a configuration and processing procedure that display and switch between the measurement result display screen 20 corresponding to the "first measurement result display screen" for the present invention and the measurement result display screen 30 corresponding to the "second measurement result display screen" for the present invention according to an operation of the operator 4 have been described, it is also possible to use a configuration and processing procedure that automatically switch between and displays the "first measurement result display screen" and the "second measurement result display screen" at fixed time intervals and a configuration and processing procedure that display the "first measurement result display screen" and the "second measurement result display screen" side by side. It is also possible to use configuration and processing procedure that can display only the "first measurement result display screen" (that is, the "second measurement result display screen" cannot be displayed), or use a configuration and processing procedure that can display only the "second measurement result display screen" (that is, the "first measurement result display screen" cannot be displayed).

Although a configuration of the measurement apparatus 1 that is integrally provided with a "measurement result display apparatus" and a "display" has been described as an example, it is also possible to use a configuration where the "first measurement result display screen", the "second measurement result display screen", and the like are displayed on a "display (or display apparatus)" as an external device that is separate from the "measurement result display apparatus". In addition, although a configuration of the measurement apparatus 1 that is integrally provided with a "measurement result display apparatus" and a "measurement apparatus" has been described as an example, it is also possible to use a configuration where the "first measurement result display screen", the "second measurement result display screen", and the like are displayed based on the "measurement result data" generated by a "measurement apparatus" as an external device that is separate from the "measurement result display apparatus".

In addition, although a configuration and a processing procedure that display contact resistances (impedances) measured during a measurement process performed for each product when the same type of products (in the present embodiment, batteries) are manufactured one after another as the object to be measured (that is, a configuration and processing content where a plurality of objects to be measured are successively measured and the contact resistances (impedances) are displayed for each object to be measured) have been described as an example, it is also possible to use a configuration and processing content that display "impedances" measured during a plurality of measurement processes for a single object to be measured (a configuration and processing content where one object to be measured is repeatedly measured and a plurality of impedances are displayed for that one object to be measured).

INDUSTRIAL APPLICABILITY

According to the present invention, changes over time in measured impedance can be displayed in an easy to identify manner. Also, according to the measurement result display apparatus, measurement system, and measurement result display processing program according to the present invention, it is possible to easily identify via which measurement terminal a displayed impedance was measured. This means that the present invention can be widely applied to measurement result display apparatuses, measurement systems, and measurement result display processing programs.

REFERENCE SIGNS LIST

100 Measurement system
1, 1A Measurement apparatus
2 Meter
2a to 2d Measurement terminal connector
3 Communicator
4 Operator
5 Display
6 Processor
7 Storage
10 Mobile terminal
20, 20a, 30, 30a Measurement result display screen
21a to 21d, 31a to 31d Measurement result display
22a, 22b Warning level display 23 Cursor display
24a to 24d Predicted value display
32, 32a Layout diagram
Dd Display data
Dma to Dmd, Dmr Measurement result data
Dp Processing program

The invention claimed is:

1. A measurement apparatus comprising:
a meter which is equipped with
a Hi-side source terminal and a Lo-side source terminal for supplying a measurement signal, and
a Hi-side sensing terminal and a Lo-side sensing terminal for signal detection,
which measure, together with measuring an impedance of a measured object,
a contact resistance between the Hi-side source terminal and a positive electrode of the measured object,
a contact resistance between the Lo-side source terminal and a negative electrode of the measured object,
a contact resistance between the Hi-side sensing terminal and the positive electrode, and
a contact resistance between the Lo-side sensing terminal and the negative electrode, and
which output measurement result data produced by encoding the measured impedance and the measured contact resistances;
a display; and
a processor that executes a measurement result display process that displays measurement results on the display based on the measurement result data,
wherein during the measurement result display process, the processor displays, on the display and based on a plurality of measurement result data of the contact resistances measured by the meter at different measurement times, a first measurement result display screen in which the contact resistances for respective measurement result data are aligned in order of measurement time.

2. The measurement apparatus according to claim 1,
wherein during the measurement result display process, the processor displays a graph indicating the contact resistance for each measurement result data in the first measurement result display screen.

3. The measurement apparatus according to claim 1,
wherein during the measurement result display process, the processor displays, on the display and based on a plurality of types of measurement result data measured by the meter via the Hi-side source terminal and the Lo-side source terminal for supplying the measurement signal and the Hi-side sensing terminal and the Lo-side sensing terminal for signal detection that are connected to a plurality of measurement terminal connectors of the measurement apparatus, a second measurement result display screen in which the contact resistances for each measurement result data are aligned corresponding to an arrangement on the measurement apparatus of the measurement terminal connectors.

4. The measurement apparatus according to claim 2,
wherein during the measurement result display process, the processor displays, on the display and based on a plurality of types of measurement result data measured by the meter via the Hi-side source terminal and the Lo-side source terminal for supplying the measurement signal and the Hi-side sensing terminal and the Lo-side sensing terminal for signal detection that are connected to a plurality of measurement terminal connectors of the measurement apparatus, a second measurement result display screen in which the contact resistances for each measurement result data are aligned corresponding to an arrangement on the measurement apparatus of the measurement terminal connectors.

5. The measurement apparatus according to claim 1,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

6. The measurement apparatus according to claim 2,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

7. The measurement apparatus according to claim 3,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

8. The measurement apparatus according to claim 4,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

9. A measurement result display method comprising:
causing a processor of a measurement apparatus to execute a measurement result display process, including
supplying a measurement signal with a Hi-side source terminal and a Lo-side source terminal of a meter of the measurement apparatus;
measuring with a Hi-side sensing terminal and a Lo-side sensing terminal of the measurement apparatus an impedance of a measured object,
a contact resistance between the Hi-side source terminal and a positive electrode of the measured object,
a contact resistance between the Lo-side source terminal and a negative electrode of the measured object,
a contact resistance between the Hi-side sensing terminal and the positive electrode, and
a contact resistance between the Lo-side sensing terminal and the negative electrode, and
outputting to a display, measurement result data produced by encoding the measured impedance and the measured contact resistances; and
displaying measurement results based on the measurement result data on the display,
wherein during the measurement result display process, the processor executes a process that displays, on the display and based on a plurality of measurement result data of the contact resistances measured by the meter at different measurement times, a first measurement result display screen in which the contact resistances for respective measurement result data are aligned in order of measurement time.

10. The measurement result display method according to claim 9,
wherein during the measurement result display process, the processor executes a process that displays a graph indicating the contact resistance for each measurement result data in the first measurement result display screen.

11. The measurement result display method according to claim 9,
wherein during the measurement result display process, the processor executes a process that displays, on the display and based on a plurality of types of measurement result data measured by the meter via the Hi-side source terminal and the Lo-side source terminal for supplying the measurement signal and the Hi-side sensing terminal and the Lo-side sensing terminal for signal detection that are connected to a plurality of measurement terminal connectors of the measurement apparatus, a second measurement result display screen in which contact resistances for each measurement result data are aligned corresponding to an arrangement on the measurement apparatus of the measurement terminal connectors.

12. The measurement result display method according to claim 10,
wherein during the measurement result display process, the processor executes a process that displays, on the display and based on a plurality of types of measurement result data measured by the meter via the Hi-side source terminal and the Lo-side source terminal for supplying the measurement signal and the Hi-side sensing terminal and the Lo-side sensing terminal for signal detection that are connected to a plurality of measurement terminal connectors of the measurement apparatus, a second measurement result display screen in which contact resistances for each measurement result data are aligned corresponding to an arrangement on the measurement apparatus of the measurement terminal connectors.

13. The measurement result display method according to claim 9,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

14. The measurement result display method according to claim 10,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

15. The measurement result display method according to claim 11,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

16. The measurement result display method according to claim 12,
wherein during the measurement result display process, when a contact resistance displayed based on the measurement result data satisfies a predetermined notification condition, the processor executes a notification process giving notification which makes it possible to identify which of the displayed contact resistances has satisfied the predetermined notification condition.

* * * * *